US011387661B2

(12) United States Patent
Fan

(10) Patent No.: US 11,387,661 B2
(45) Date of Patent: Jul. 12, 2022

(54) ELECTRONIC DEVICE, CHARGING METHOD AND DEVICE, AND COMPUTER-READABLE STORAGE MEDIUM

(71) Applicant: BEIJING XIAOMI MOBILE SOFTWARE CO., LTD., Beijing (CN)

(72) Inventor: Jie Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 111 days.

(21) Appl. No.: 16/893,414

(22) Filed: Jun. 4, 2020

(65) Prior Publication Data
US 2021/0208655 A1 Jul. 8, 2021

(30) Foreign Application Priority Data

Jan. 3, 2020 (CN) .......................... 202010006315.2

(51) Int. Cl.
*H02J 7/00* (2006.01)
*G06F 1/26* (2006.01)
*H02J 7/34* (2006.01)

(52) U.S. Cl.
CPC ............ *H02J 7/0024* (2013.01); *G06F 1/263* (2013.01); *G06F 1/266* (2013.01); *H02J 7/0013* (2013.01); *H02J 7/0019* (2013.01); *H02J 7/342* (2020.01)

(58) Field of Classification Search
CPC ........ G06F 1/1635; G06F 1/189; G06F 1/263; G06F 1/266; H02J 7/0013; H02J 7/0019; H02J 7/0024; H02J 2007/0067; H02J 7/342; Y02E 60/10; Y02P 70/50; H01M 10/4207; H01M 10/441
See application file for complete search history.

(56) References Cited

U.S. PATENT DOCUMENTS

| 10,581,269 | B2 * | 3/2020 | Valin ................... H01M 10/465 |
| 10,866,628 | B2 * | 12/2020 | Waters ................. G06F 1/3206 |
| 11,075,526 | B2 * | 7/2021 | Niizuma ................ B60L 53/12 |
| 2006/0019075 | A1 * | 1/2006 | Myoung .............. H05K 3/4691 |
| | | | 428/209 |

(Continued)

FOREIGN PATENT DOCUMENTS

| CN | 104218632 A | 12/2014 |
| CN | 106329652 A | 1/2017 |

(Continued)

OTHER PUBLICATIONS

Extended European Search Report in U.S. Appl. No. 20/182,948, dated Aug. 19, 2020.

*Primary Examiner* — Thomas J. Cleary
(74) *Attorney, Agent, or Firm* — Syncoda LLC; Feng Ma

(57) ABSTRACT

An electronic device includes a first battery, a second battery, and a serial-parallel conversion circuit. The serial-parallel conversion circuit is coupled to the first battery and the second battery, and is configured to, according to a control signal, couple the first battery and the second battery in series so as to reversely charge on a to-be-charged device by the first battery and the second battery, or couple the first battery and the second battery in parallel so as to supply power to the electronic device by the first battery and the second battery.

18 Claims, 8 Drawing Sheets

(56) References Cited

U.S. PATENT DOCUMENTS

| | | | | |
|---|---|---|---|---|
| 2006/0213682 | A1* | 9/2006 | Moon | H05K 1/028 174/255 |
| 2012/0119696 | A1* | 5/2012 | Picard | H01M 10/48 320/107 |
| 2013/0166928 | A1* | 6/2013 | Yang | G06F 1/3212 713/300 |
| 2013/0320926 | A1* | 12/2013 | Kerfoot, Jr | H01M 10/44 320/117 |
| 2015/0091497 | A1* | 4/2015 | Leung | H02J 7/0029 320/107 |
| 2015/0092343 | A1 | 4/2015 | Rich et al. | |
| 2015/0188331 | A1* | 7/2015 | Negru | H02J 7/0022 320/112 |
| 2016/0117274 | A1* | 4/2016 | Waters | G06F 13/362 710/106 |
| 2016/0118826 | A1* | 4/2016 | Dong | H02J 7/34 320/107 |
| 2016/0163480 | A1* | 6/2016 | Lester | G06F 1/26 713/300 |
| 2016/0219664 | A1* | 7/2016 | Ellenberger | H05B 45/10 |
| 2017/0115711 | A1* | 4/2017 | Jaramillo | H04L 12/40045 |
| 2017/0170671 | A1* | 6/2017 | Mergener | H02J 7/0042 |
| 2018/0316203 | A1* | 11/2018 | Zeng | H02J 7/0042 |
| 2019/0296569 | A1* | 9/2019 | Chen | H02J 7/0045 |
| 2019/0354163 | A1* | 11/2019 | Bodnaruk | G06F 13/385 |
| 2020/0028373 | A1* | 1/2020 | Jiang | H02J 7/0045 |
| 2020/0127467 | A1* | 4/2020 | Li | H02J 7/0072 |
| 2020/0321649 | A1* | 10/2020 | Zhan | H01M 10/441 |
| 2021/0175735 | A1* | 6/2021 | Fan | H01M 10/44 |
| 2021/0184475 | A1* | 6/2021 | Sun | H02J 7/0024 |
| 2021/0218251 | A1* | 7/2021 | Chettiar | H02J 7/35 |
| 2021/0226474 | A1* | 7/2021 | Liu | H02J 7/0068 |
| 2021/0359535 | A1* | 11/2021 | Tseng | H02J 7/0024 |

FOREIGN PATENT DOCUMENTS

| | | | | |
|---|---|---|---|---|
| CN | 108964182 A | * | 12/2018 | G06F 1/266 |
| WO | 2018205684 A1 | | 11/2018 | |

* cited by examiner

In response to receiving event information indicating to reversely charge a charged device, controlling the serial-to-parallel conversion circuit to connect the first battery and the second battery in series, to charge the charged device by the first battery and the second battery connected in series
　　　501

ELECTRONIC DEVICE, CHARGING METHOD AND DEVICE, AND COMPUTER-READABLE STORAGE MEDIUM

CROSS-REFERENCE TO RELATED APPLICATION

This application claims priority to Chinese Patent Application No. 202010006315.2 filed on Jan. 3, 2020, the disclosure of which is hereby incorporated by reference in its entirety.

BACKGROUND

Some electronic devices are implemented with folding screens. Due to characteristics of the folding screen, in design of batteries, a form of two batteries connected in parallel is often employed, and a voltage of the parallel batteries is between 3.6 V and 4.45 V. The two batteries are connected by a Flexible Printed Circuit (FPC), to facilitate folding and unfolding.

SUMMARY

The present disclosure relates generally to the field of charging technologies, and more specifically to an electronic device, a charging method and device, and a computer-readable storage medium.

According to a first aspect of embodiments of the present disclosure, there is provided an electronic device. The electronic device can include a first battery, a second battery, and a serial-parallel conversion circuit; the serial-parallel conversion circuit is connected to the first battery and the second battery, and is configured to connect the first battery and the second battery in series so as to reversely charge a to-be-charged device by the first battery and the second battery or to connect the first battery and the second battery in parallel so as to supply power by the first battery and the second battery, according to a control signal.

In some embodiments, the serial-parallel conversion circuit can be configured to receive the control signal from a processor or a charging chip.

In some embodiments, the serial-parallel conversion circuit can include a first switching device, a second switching device, and a third switching device; a first terminal of the first switching device is connected to an anode of the first battery, and a second terminal of the first switching device is connected to an anode of the second battery;

a first terminal of the second switching device is connected to a cathode of the second battery, and a second terminal of the second switching device is connected to a cathode of the first battery;

a first terminal of the third switching device is connected to the second terminal of the first switching device, and a second terminal of the third switching device is connected to the second terminal of the second switching device; and a control terminal of the first switching device, a control terminal of the second switching device, and a control terminal of the third switching device are connected to the processor in the electronic device, and are configured to turn on or off the respective switching devices according to a received control signal, so that the first battery and the second battery are connected in series, or the first battery and the second battery are connected in parallel.

In some embodiments, the electronic device can further include a USB switching circuit, a USB protocol chip and a charging interface; the USB switching circuit is connected to the charging interface and the processor in the electronic device, respectively, to form a first communication channel for communication between the processor and the charging interface; and is connected to the charging interface and the USB protocol chip which is connected to the processor, respectively, to form a second communication channel for communication between the processor, the USB protocol chip and the charging interface; the USB switching circuit is connected to the processor, and is configured to switch to the first communication channel or the second communication channel according to the control signal of the processor.

In some embodiments, a first group of terminals of the USB switching circuit can be connected to the charging interface, a second group of terminals of the USB switching circuit can be connected to a DP pin and a DM pin of the processor in the electronic device, a third group of terminals of the USB switching circuit can be connected to a first group of terminals of the USB protocol chip, and a second group of terminals of the USB protocol chip can be connected to the DP pin and the DM pin; and a control terminal of the USB switching circuit can be connected to a channel switching pin of the processor, and can be configured to turn on the first group of terminals and the second group of terminals of the USB switching circuit or to turn on the first group of terminals and the third group of terminals of the USB switching circuit according to the control signal of the processor.

In some embodiments, the electronic device can further include a fourth switching device, a first terminal of the fourth switching device is connected to a power pin Vbus of the charging interface, a second terminal of the fourth switching device is connected to a power input terminal of the USB protocol chip, and a control terminal of the fourth switching device is connected to the processor of the electronic device, and is configured to turn on or turn off the power pin Vbus of the charging interface and the power input terminal of the USB protocol chip according to the control signal of the processor.

In some embodiments, the electronic device can further include a power supply chip; the power supply chip is connected to the processor and the USB protocol chip, respectively, and is configured to supply power to the USB protocol chip or stop supplying power to the USB protocol chip according to the control signal of the processor, and the USB protocol chip can be electrically connected to one of the power supply chip and the power pin Vbus at a time.

In some embodiments, the electronic device can be a terminal with a folding screen.

According to a second aspect of the embodiments of the present disclosure, there is provided a charging method, which can be applicable to an electronic device, the electronic device including a first battery, a second battery, a serial-parallel conversion circuit, and a processor. The method can include:

in response to receiving event information indicating to reversely charge a to-be-charged device, controlling the serial-to-parallel conversion circuit to connect the first battery and the second battery in series to charge the to-be-charged device by the first battery and the second battery connected in series.

In some embodiments, prior to controlling the serial-to-parallel conversion circuit to connect the first battery and the second battery in series, the method can further include:

obtaining the event information sent by a charging chip, the event information indicating that the charging chip detects a presence of a pull-down resistor on a charging line;

in response to the event information, controlling a USB switching circuit to switch to a second communication channel which is formed between a USB protocol chip, a USB switching circuit and a charging interface, and simultaneously controlling a power supply chip to supply power to a USB protocol chip which sends a handshake protocol to the to-be-charged device through the second communication channel and receives a charging protocol feedback from the to-be-charged device; and obtaining handshake success information sent by the USB protocol chip.

In some embodiments, subsequent to charging the to-be-charged device by the first battery and the second battery connected in series, the method can further include:

controlling the power supply chip to stop supplying power to the USB protocol chip; and simultaneously controlling a fourth switching device to be turned on, so that a power pin Vbus of the charging interface supplies power to the USB protocol chip.

According to a third aspect of the embodiments of the present disclosure, a charging device is provided, which can be applicable to an electronic device, the electronic device including a first battery, a second battery, a serial-parallel conversion circuit, and a processor. The device can include:

a reverse charging control module, configured to control the serial-to-parallel conversion circuit to connect the first battery and the second battery in series in response to receiving event information indicating reversely charge a to-be-charged device, to charge the to-be-charged device by the first battery and the second battery connected in series.

In some embodiments, the device can further include:

an event information obtaining module, configured to obtain event information sent by a charging chip, the event information indicating that the charging chip detects a presence of a pull-down resistor on a charging line;

an event information response module, configured to, in response to the event information, control a USB switching circuit to switch to a second communication channel and simultaneously control a power supply chip to supply power to a USB protocol chip which sends a handshake protocol to the to-be-charged device through the second communication channel, wherein the handshake protocol reaches the to-be-charged device through the USB switching circuit and a charging interface in turn, and the to-be-charged device feeds back a charging protocol; and a handshake information obtaining module, configured to obtain handshake success information sent by the USB protocol chip.

In some embodiments, the device can further include:

a power supply module, configured to control the power supply chip to stop supplying power to the USB protocol chip and simultaneously control a fourth switching device to be turned on, so that a power pin Vbus of the charging interface supplies power to the USB protocol chip.

According to a fourth aspect of the embodiments of the present disclosure, there is provided an electronic device. The electronic device can include:

a processor; and a memory device for storing instructions executable by the processor, wherein the processor is configured to execute the executable instructions in the memory to perform steps of the method of the second aspect.

According to a fifth aspect of the embodiments of the present disclosure, there is provided a readable storage medium having stored thereon executable instructions which, when executed by a processor, performs steps of the method of the second aspect.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the disclosure and constitute a part thereof, show embodiments consistent with the present disclosure, and serve along with the specification to explain the principles of the present disclosure.

DETAILED DESCRIPTION

Exemplary embodiments will be described in detail herein, examples of which are illustrated in the accompanying drawings. When involving the accompanying drawings, the following description refers to the same or similar elements in the different figures unless otherwise indicated. The embodiments described in the following exemplary embodiments do not represent all embodiments consistent with the present invention. Instead, they are merely examples of devices consistent with aspects of the present invention as detailed in the appended claims.

In some applications, if there is a need for charging when a user goes out, the electronic device with the folding screen can be used as a charging device for reverse charging (that is, in the OTG form). In the reverse charging process, a boost circuit can be provided, and the boost circuit will can the battery voltage (3.6 V-4.45 V) to a higher voltage (such as 5 V), and then the function of charging externally can be realized, with a small charging current of about 500 mA.

However, providing the boost circuit in the electronic device will increase design difficulty of the electronic device, and a high-power charging is not supported in the existing boost circuit, which results in a long charging time and cannot satisfy the user's demand for rapid charging.

Various embodiments of the present disclosure provide an electronic device with a serial-parallel conversion circuit, and two batteries in the electronic device can be connected in parallel or in series by controlling the serial-parallel conversion circuit. For example, the two batteries are connected in parallel when supplying power to the electronic device, and are connected in series when reversely charging a to-be-charged device. The voltage of the two batteries in series can be doubled compared to the voltage of the two batteries in parallel, so that the charging power can be increased, and there is no need to additionally provide the booster circuit in the electronic device, which can reduce the design difficulty of the electronic device.

It should be noted that, for convenience of description, in subsequent embodiments only circuits or modules of the electronic device involved and improved in the reverse charging process are described. For normal operations of these circuits or modules, some corresponding support circuits may also be needed in the electronic device.

Figure 1A:
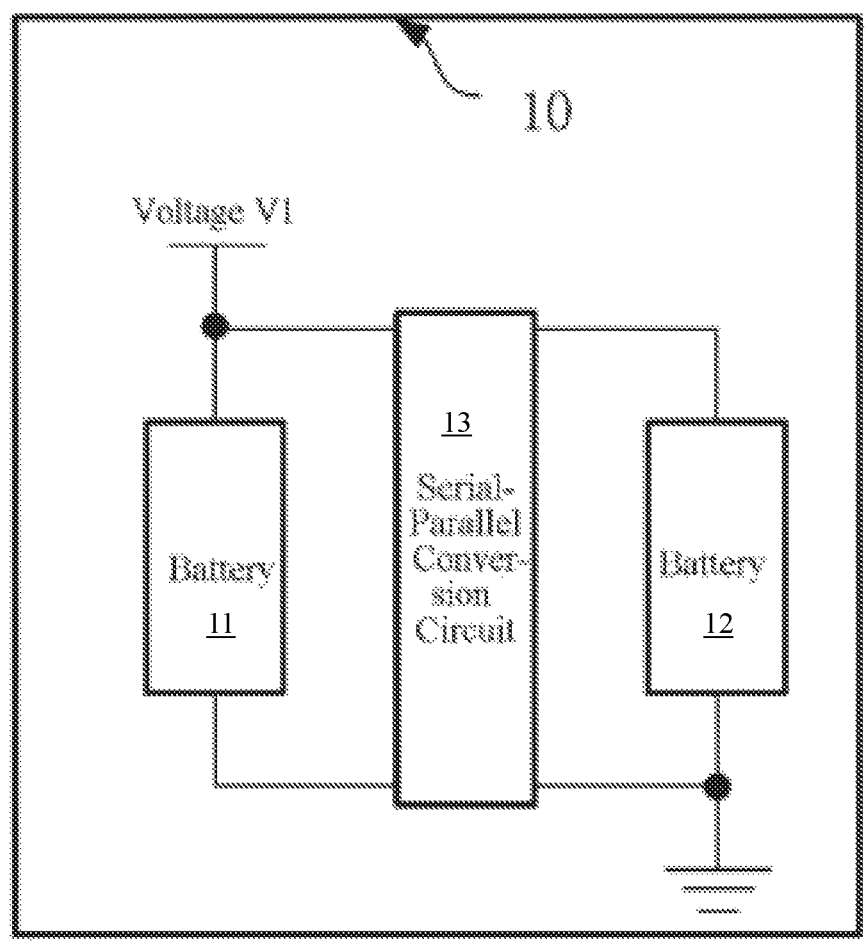
FIG. 1A is a block diagram showing an electronic device according to some embodiments.
Figure 1B:
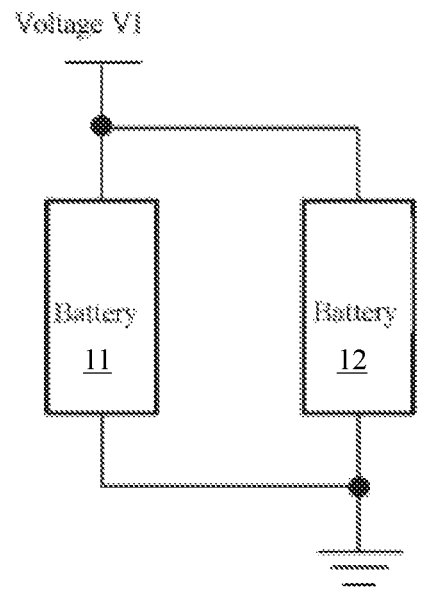
FIG. 1B is a schematic diagram showing two batteries connected in parallel according to some embodiments.
Figure 1C:
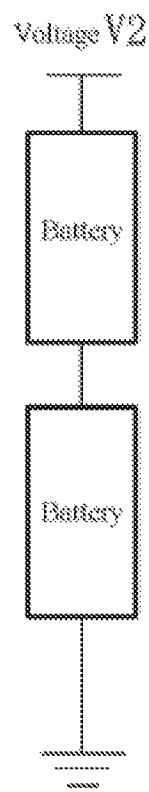
FIG. 1C is a schematic diagram showing two batteries connected in series according to some embodiments.

FIG. 1A is a block diagram showing an electronic device according to some embodiments, FIG. 1B is a schematic diagram showing two batteries connected in parallel according to some embodiments, and FIG. 1C is a schematic diagram showing two batteries connected in series according to some embodiments.

Referring to FIG. 1A, an electronic device 10 includes a first battery 11, a second battery 12, and a serial-parallel conversion circuit 13. The serial-parallel conversion circuit 13 is connected to the first battery 11 and the second battery 12, respectively, and configured to connect the first battery 11 and the second battery 12 in series so as to perform reverse charging on a to-be-charged device by the first battery 11 and the second battery 12 or to connect the first battery 11 and the second battery 12 in parallel so as to supply power by the first battery 11 and the second battery 12, according to a control signal. An illustration of the parallel connection of the first battery 11 and the second battery 12 is shown in FIG. 1B, and the voltage is V1. An illustration of the serial connection of the first battery 11 and the second battery 12 is shown in FIG. 1C, and the voltage is V2. It can be understood that the voltage V2 is twice as the voltage V1. For example, V1 is 4.45 V, and then V2 is 8.9 V.

Figure 2:
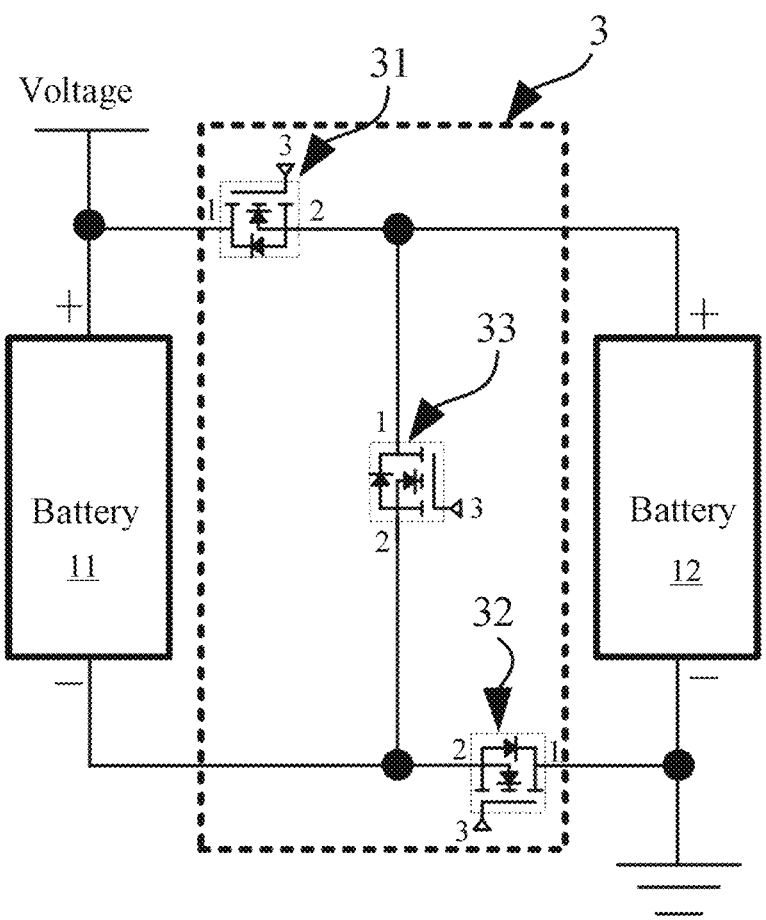
FIG. 2 is a circuit diagram showing a serial-parallel conversion circuit according to some embodiments.

In these embodiments, there is provided a circuit for the serial-parallel conversion circuit. FIG. 2 is a circuit diagram showing a serial-parallel conversion circuit according to some embodiments. Referring to FIG. 2, the serial-parallel conversion circuit 13 includes a first switching device 31, a second switching device 32 and a third switching device 33.

A first terminal (reference sign 1 in FIG. 2) of the first switching device 31 is connected to an anode (reference sign + in FIG. 2) of the first battery 11, and a second terminal (reference sign 2 in FIG. 2) of the first switching device 31 is connected to an anode (reference sign + in FIG. 2) of the second battery.

A first terminal (reference sign 1 in FIG. 2) of the second switching device 32 is connected to a cathode (reference sign − in FIG. 2) of the second battery, and a second terminal (reference sign 2 in FIG. 2) of the second switching device 32 is connected to a cathode (reference sign − in FIG. 2) of the first battery.

A first terminal (reference sign 1 in FIG. 2) of the third switching device 33 is connected to the second terminal of the first switching device 31, and a second terminal (reference sign 2 in FIG. 2) of the third switching device 33 is connected to the second terminal of the second switching device 32.

A control terminal (reference sign 3 in FIG. 2) of the first switching device 31, a control terminal (reference sign 3 in FIG. 2) of the second switching device 32, and a control terminal (reference sign 3 in FIG. 2) of the third switching device 33 are respectively connected to a processor (not shown in FIG. 2) in the electronic device, and are configured to turn on or off the respective switching devices according to a received control signal, so that the first battery 11 and the second battery 12 are connected in series, or the first battery 11 and the second battery 12 are connected in parallel.

It should be noted that, the first switching device, the second switching device, and the third switching device in the embodiment may be implemented by using transistors or MOSFETs, or may be implemented by using switching circuits. It can be selected by the technician according to specific scenarios, and the corresponding solutions fall into the protection scope of the present disclosure.

In these embodiments, an operating principle of the serial-parallel conversion circuit shown in FIG. 2 can be as follows.

Figure 3A:
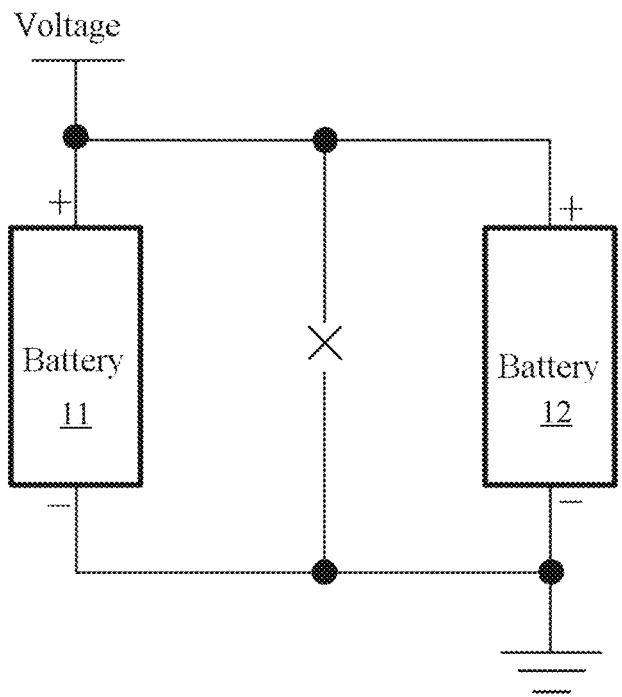
FIG. 3A is a schematic diagram showing operating states of individual switching devices in a serial-parallel conversion circuit when batteries supply power to an electronic device according to some embodiments.

In a first scenario, when the electronic device needs to be supplied power, control signals are sent to the first switching device 31, the second switching device 32, and the third switching device 33, respectively. The control signals sent to the first switching device 31 and the second switching device 32 are valid signals, so that the first switching device 31 and the second switching device 32 are turned on, and the control signal sent to the third switching device 33 is an invalid signal, so that the third switching device 33 is turned off. A result is shown in FIG. 3A. That is, the effect of the two batteries connected in parallel as shown in FIG. 1B can be obtained.

Figure 3B:
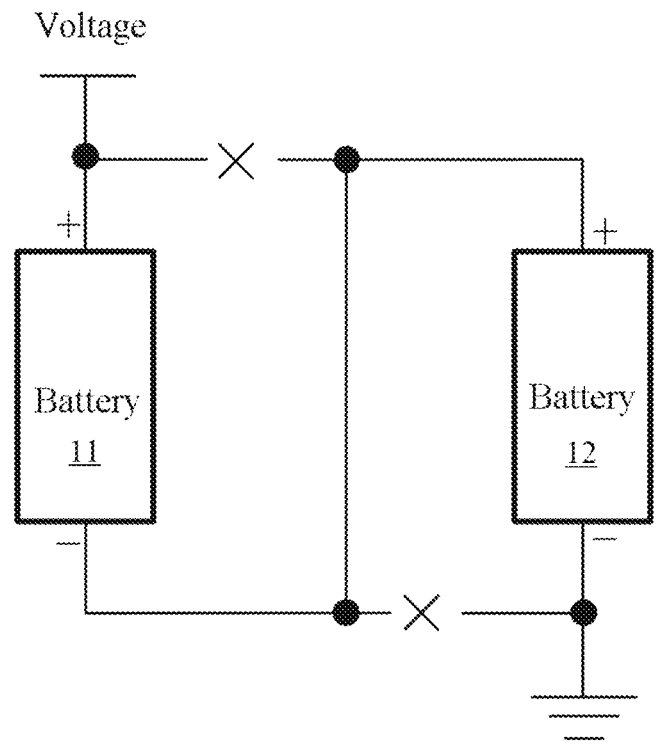
FIG. 3B is a schematic diagram showing operating states of individual switching devices in a serial-parallel conversion circuit when an electronic device charges a to-be-charged device.

In a second scenario, when the electronic device is used as a power source to charge the to-be-charged device, the control signals are sent to the first switching device 31, the second switching device 32, and the third switching device 33, respectively. The control signals sent to the first switching device 31 and the second switching device 32 are invalid signals, so that the first switching device 31 and the second switching device 32 are turned off, and the control signal sent to the third switching device 33 is a valid signal, so that the third switching device 33 is turned on. A result is shown in FIG. 3B. That is, the effect of the two batteries connected in series as shown in FIG. 1C can be obtained.

Figures 4, 5:
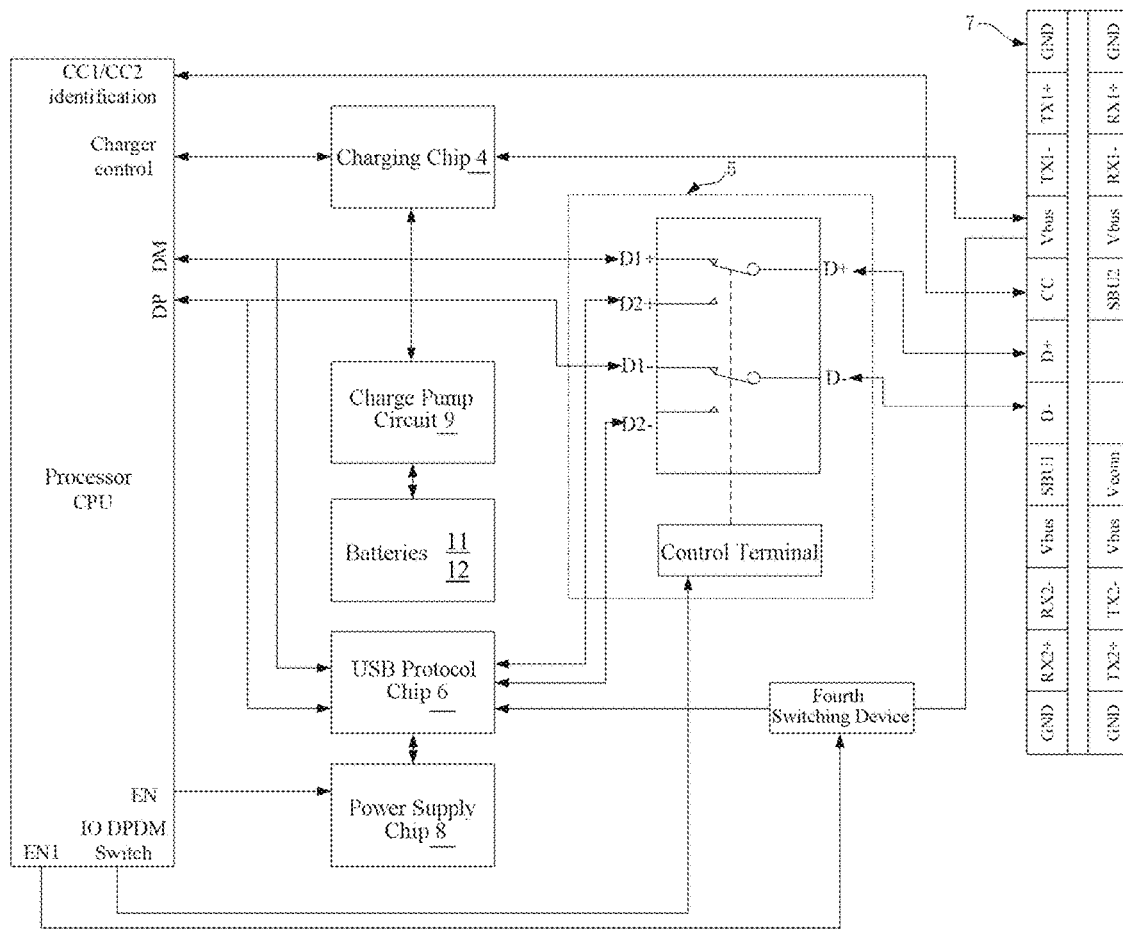
FIG. 4 is a block diagram showing another electronic device according to some embodiments.
FIG. 5 is a flowchart showing a charging method according to some embodiments.

FIG. 4 is a block diagram showing another electronic device according to some embodiments. Referring to FIG. 4, the electronic device can further include a processor CPU and a charging chip 4. The control signals of the first switching device 31, the second switching device 32, and the third switching device 33 can come from the processor CPU or the charging chip 4 in the electronic device. Connection relationships between the processor CPU or the charging chip 4 and the individual switching devices (31, 32, 33) are not shown, and can be set according to specific scenarios. In an embodiment, the charging chip sends the control signals to the switching devices, which can improve a switching efficiency.

Continuing to refer to FIG. 4, the electronic device can further include a USB switching circuit 5, a USB protocol chip 6 and a charging interface 7. The USB switching circuit 5 is connected to the charging interface 7 and the processor CPU in the electronic device, to form a first communication channel for communicating between the processor CPU and the charging interface 7, and is connected to the charging interface 7 and the USB protocol chip 6 which is connected to the processor CPU, to form a second communication channel for communicating between the processor CPU, the USB protocol chip 6 and the charging interface 7. The USB switching circuit 5 is connected to the processor CPU, and is configured to switch to the first communication channel or the second communication channel according to the control signal of the processor CPU.

Continuing to refer to FIG. 4, in the embodiment, the USB switching circuit 5 includes a first group of terminals, a second group of terminals, and a third group of terminals, and each group of terminals includes a data positive terminal (DP, shown as D+ in FIG. 4) and a data minus terminal (DM, shown as D− in FIG. 4). The first group of terminals (D+, D−) of the USB switching circuit 5 is connected to the charging interface 7; the second group of terminals (D1+, D1−) of the USB switching circuit 5 is connected to a DP pin and a DM pin of the processor CPU in the electronic device; a third group of terminals (D2+, D2−) of the USB switching circuit 5 is connected to a first group of terminals of the USB protocol chip 6; and a second group of terminals of the USB protocol chip 6 is connected to the DP pin and the DM pin of the processor CPU. A control terminal of the USB switching circuit 5 is connected to a channel switching pin (IO DPDM Switch) of the processor CPU, and configured to turn on the first group of terminals (D+, D−) and the second group of terminals (D1+, D1−) of the USB switching circuit 5 so as to form the first communication channel between the processor CPU and the charging interface 7, or to turn on the first group of terminals (D+, D−) and the third group of terminals (D2+, D2−) of the USB switching circuit 5 so as to form the second communication channel between the processor CPU and the charging interface 7, according to the control signal of the processor CPU.

It should be noted that, in order to ensure that the electronic device can be normally supplied power, a power supply chip 8 for supplying power to the USB protocol chip 6 can also be provided, and the power supply chip 6 can be connected to an EN pin of the processor CPU and can be configured to supply power to the USB protocol chip 6 or stop supplying power to the USB protocol chip 6 according to the control signal of the processor CPU. The electronic device can further include a charge pump circuit 9 provided between the batteries (1, 2) and the charging chip 4, the charge pump circuit 9 can be connected to the processor through an I2C communication bus, and can be configured to discharge to the charging chip 4, so that charges of the batteries (1, 2) arrive at the to-be-charged device (not shown in the figure) through the charge pump circuit 9, the charging chip 4 and the charging interface 7.

With reference to the circuits of FIG. 2 and FIG. 4, the operating process of the electronic device is as follows:

The charging chip 4 detects a level at a SBU1 pin in the charging interface 7. If the SBU1 pin is at a high level, it indicates that no USB connector is inserted by the user, that is, no device needs to be charged; if the SBU1 pin is at a low level, it indicates that the user has inserted the USB connector and there is a device that needs to be charged. The level at the SBU1 pin can be provided by setting a pull-down resistor on the USB connector. The resistance of the pull-down resistor can be 10K ohm, 100K ohm, 10M ohm, etc. Accordingly, the voltage of the low level will also change correspondingly, which is not limited herein.

When the charging chip 4 detects that the SBU1 pin is at the low level, it will report this event information to the processor, and at the same time, the charging chip 4 switches to the OTG state. However, at this time, the charging chip 4 will not charge the to-be-charged device.

In a default state, the USB switching circuit 5 turns on the first group of terminals (D+, D−) and the second group of terminals (D1+, D1−). That is, the charging interface 7 is connected to the processor CPU and the charging chip 4 through the USB switching circuit 5 (the connection relationship is not shown) instead of being connected to the USB protocol chip 6. In this way, this embodiment can be compatible with charging the electronic device without affecting a rapid charging protocol and function of the charger. When receiving the reported event information, the processor CPU can send the control signal to the USB switching circuit 5 through the (IO DPDM Switch) pin in response to the event information, so that the USB switching circuit 5 turns on the first group of terminals (D+, D−) and the third group of terminals (D2+, D2−), thereby switching to the second communication channel. At this time the USB switching circuit 5 is disconnected from the charging chip 4 and the processor CPU, and is connected to the USB protocol chip 6.

At the same time, the processor CPU enables the power supply chip 8 through the EN pin to supply power to the USB protocol chip 6. The USB protocol chip 6 can adopt a BC1.2 protocol in the related art, thereby supporting various types of mobile phones. The USB protocol chip 6 sends a handshake protocol to the charged device through the second communication channel, and the handshake protocol arrives at the to-be-charged device through the USB switching circuit 5 and the charging interface 7 in turn. The USB protocol chip 6 obtains a charging protocol fed back from the to-be-charged device, and obtains handshake success information.

It should be noted that after a successful handshake, the charged device opens the charging channel and waits for the charging current to flow in. At this time, the processor CPU controls to enable the charge pump circuit 9 through the I2C communication bus. The charge pump circuit 9 releases energy externally and charge the to-be-charged device according to a maximum charging current. The charging current can be up to more than 3 A, depending on the continuous discharge capacity of the batteries (1, 2), which is much higher than the OTG charging current 500 mA of the existing devices.

When detecting the completion of charging, the to-be-charged device can communicate with the electronic device again, so that the electronic device can disconnect the charging loop. The processor CPU then sends control signals to the circuits or modules, thereby returning the circuits or modules to the non-OTG state.

In the process of the electronic device charging the to-be-charged device, the power supply chip 8 supplies power to the USB protocol chip 6, and the power supply chip 8 may also cause power loss. Considering that a Vbus pin in the charging interface 7 is at a high level, a fourth switching device can be provided between the charging interface 7 and the USB protocol chip 6 in this embodiment. A first terminal of the fourth switching device is connected to the power pin Vbus of the charging interface 7, a second terminal of the fourth switching device is connected to a power input terminal (not shown) of the USB protocol chip 6, and a control terminal of the fourth switching device is connected to (an EN1 pin of) the processor CPU, and is configured to turn on or off the power pin Vbus of the charging interface 7 and the power input terminal of the USB protocol chip 6 according to the control signal of the processor.

After the electronic device charges the to-be-charged device, the processor CPU can send a control signal to the fourth switching device to turn on the fourth switching device, so that the fourth switching device turns on the power pin Vbus of the charging interface 7 and the power input terminal of the USB protocol chip 6. Thai is, Vbus supplies power to the USB protocol chip 6. At the same time, the processor CPU can send the control signal to the power supply chip 8 to control the power supply chip 8 to stop supplying power to the USB protocol chip 6. When the electronic device is no longer charging the to-be-charged device or is ready to not charge the to-be-charged device any more, the power supply chip 8 is then controlled to supply power to the USB protocol chip 6, and the fourth switching device is turned off. In other words, the USB protocol chip 6 is electrically connected to one of the power supply chip 8 or the power pin Vbus in the charging interface at a time. The USB protocol chip 6 is powered by either the power supply chip 8 or the power pin Vbus in the charging interface 7. In this way, this embodiment can reduce the power loss of the electronic device itself.

It can be seen that by providing the serial-parallel conversion circuit between the first battery and the second battery in the embodiments of the present disclosure, the first battery and the second battery can supply power to the electronic device when being connected in parallel and reversely charge the to-be-charged device when being connected in series. It can be seen that by connecting the two batteries in series in the embodiment of the present disclosure, the voltage of the batteries of the electronic device can be doubled. As such, there is no need to additionally provide the boost circuit in the electronic device, which can reduce the design difficulty of the electronic device. Moreover, since the voltage is doubled, the charging power can be increased, which can reduce the charging time and satisfy the demand for fast charging to a certain extent.

FIG. 5 is a flowchart showing a charging method according to some embodiments. Referring to FIG. 5, the charging method includes:

in step 501, in response to receiving event information indicating to reversely charge a to-be-charged device, controlling the serial-to-parallel conversion circuit to connect the first battery and the second battery in series to charge the to-be-charged device by the first battery and the second battery connected in series.

Figure 6:
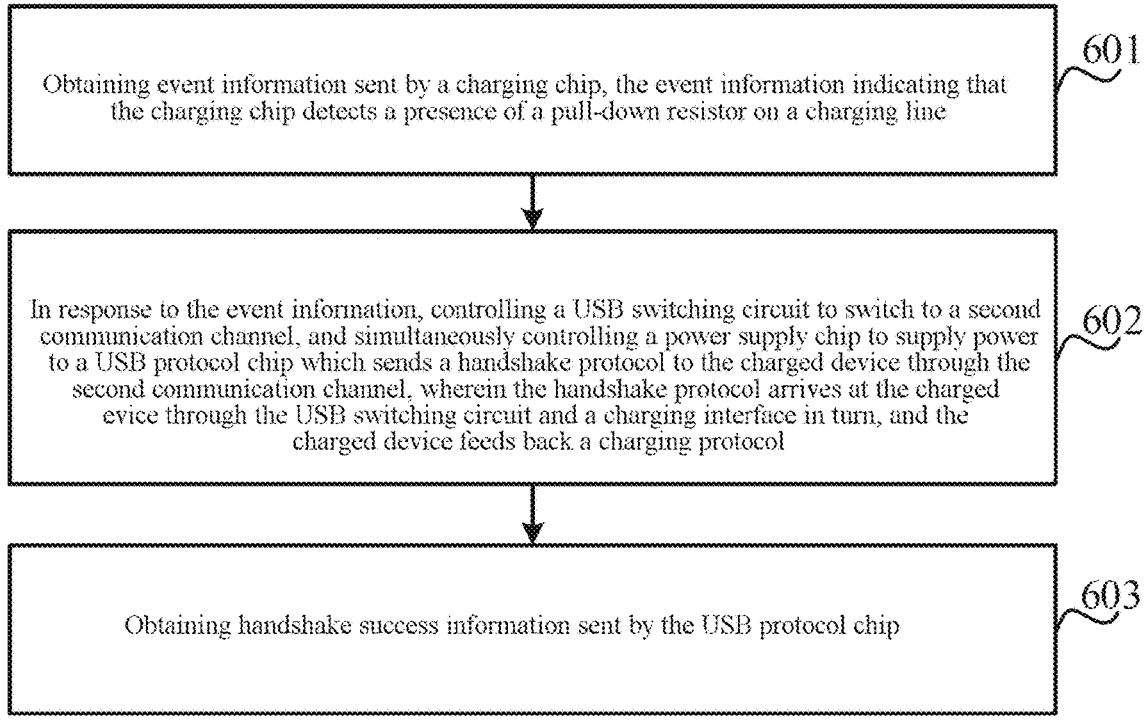
FIG. 6 is a flowchart showing another charging method according to some embodiments.

FIG. 6 is a flowchart showing another charging method according to some embodiments. Referring to FIG. 6, on the basis of the charging method shown in FIG. 5, prior to the step 501, the method further includes:

in step 601, obtaining the event information sent by a charging chip, the event information indicating that the charging chip detects a presence of a pull-down resistor on a charging line;

in step 602, in response to the event information, controlling a USB switching circuit to switch to a second communication channel, and simultaneously controlling a power supply chip to supply power to a USB protocol chip which sends a handshake protocol to the to-be-charged device through the second communication channel, wherein the handshake protocol arrives at the to-be-charged device through the USB switching circuit and a charging interface in turn; the to-be-charged device feeds back a charging protocol; and in step 603, obtaining handshake success information sent by the USB protocol chip.

Figure 7:
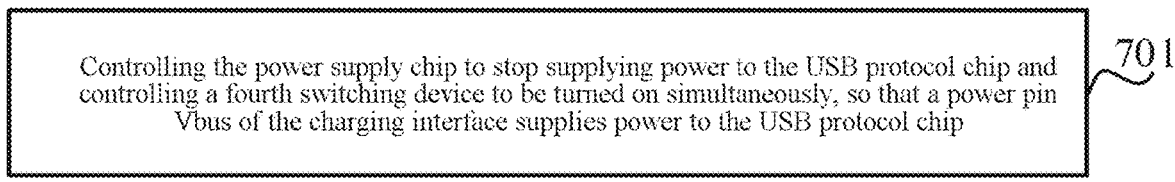
FIG. 7 is a flow chart showing yet another charging method according to some embodiments.

FIG. 7 is a flowchart showing yet another charging method according to some embodiments. Referring to FIG. 7, on the basis of the charging method shown in FIG. 5, subsequent to the step 501, the method further includes:

in step 701, controlling the power supply chip to stop supplying power to the USB protocol chip and controlling a fourth switching device to be turned on simultaneously, so that a power pin Vbus of the charging interface supplies power to the USB protocol chip.

It should be noted that the charging method shown in this embodiment has been described in detail in the operating process of the above electronic devices in FIGS. 1A to 4, and reference can be made to the foregoing description of the electronic devices, which will not be repeated here.

It can be seen that by obtaining the event information of reversely charging the to-be-charged device in the embodiment, the serial-parallel conversion circuit is controlled to connect the first battery and the second battery in series, and the first battery and second battery charge connected in series charge the to-be-charged device. As such, by connecting two batteries in series in the embodiment of the present disclosure, the voltage of the batteries of the electronic device can be doubled, and there is no need to additionally provide the boost circuit in the electronic device, which can reduce the design difficulty of the electronic device. Moreover, since the voltage is doubled in the embodiment, the charging power can be increased, which can reduce the charging time and satisfy the demand for fast charging to a certain extent.

Figure 8:
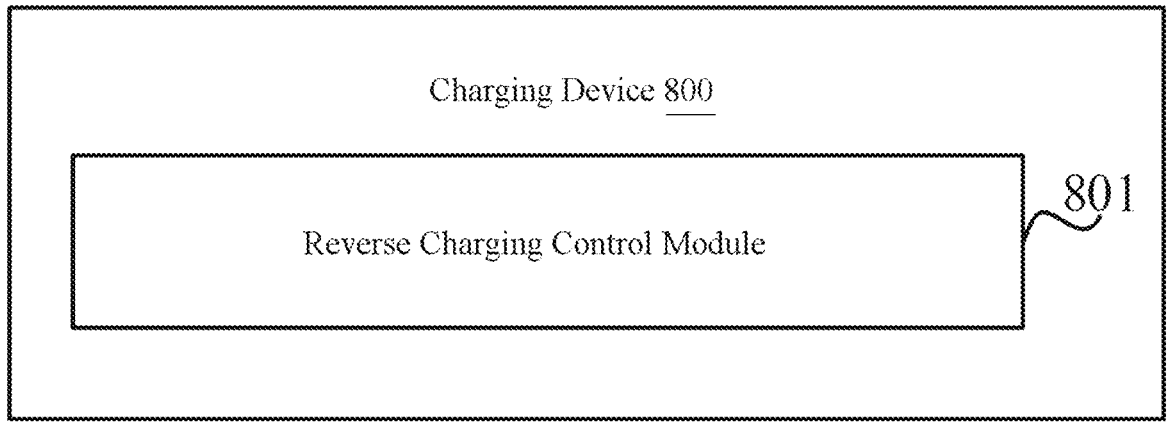
FIG. 8 is a first block diagram showing a charging device according to some embodiments.

FIG. 8 is a block diagram showing a charging device according to some embodiments, which is applicable to the electronic devices described in FIGS. 1A to 4. Referring to FIG. 8, the charging device 800 includes:

a reverse charging control module 801, configured to control a serial-to-parallel conversion circuit to connect a first battery and a second battery in series in response to receiving event information indicating to reversely charge a to-be-charged device, so as to charge the to-be-charged device by the first battery and the second battery connected in series.

Figure 9:
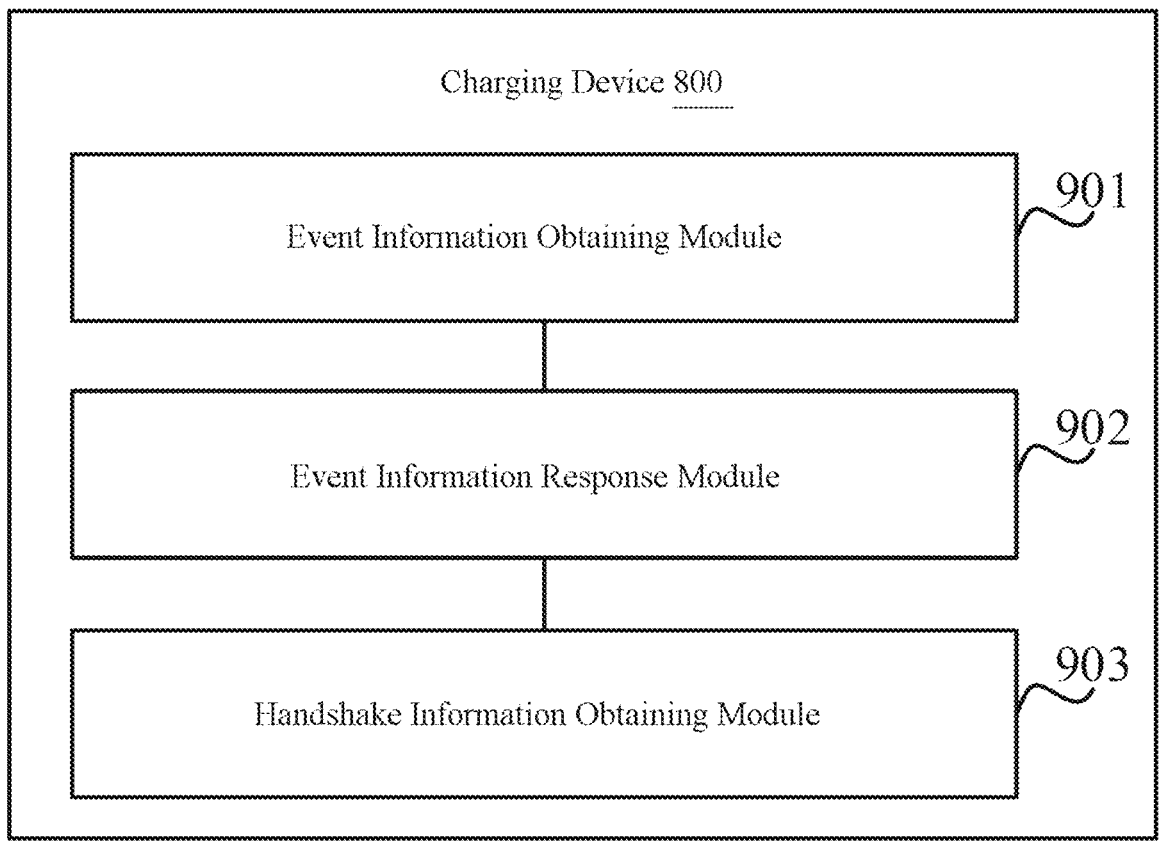
FIG. 9 is a second block diagram showing a charging device according to some embodiments.
Figure 10:
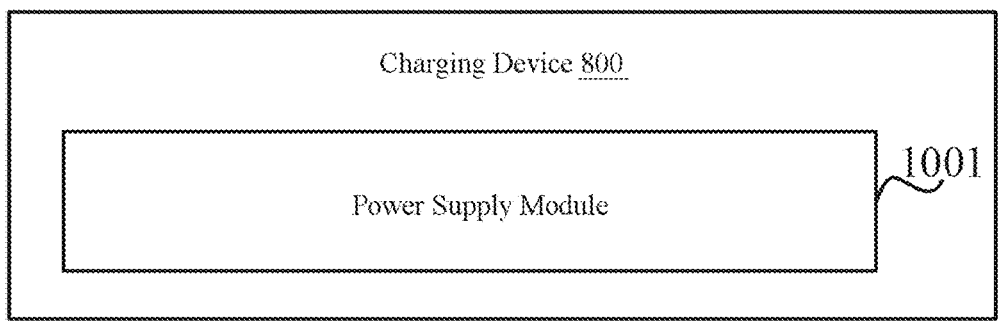
FIG. 10 is a third block diagram showing a charging device according to some embodiments.

FIG. 9 is a block diagram showing another charging device according to some embodiments. Referring to FIG. 9, on the basis of the charging device shown in FIG. 8, the charging device 800 further includes:

an event information obtaining module 901, configured to obtain the event information sent by a charging chip, the event information indicating that the charging chip detects a presence of a pull-down resistor on a charging line;

an event information response module 902, configured to, in response to the event information, control a USB switching circuit to switch to a second communication channel and simultaneously control a power supply chip to supply power to a USB protocol chip which sends a handshake protocol to the to-be-charged device through the second communication channel, wherein the handshake protocol arrives at the to-be-charged device through the USB switching circuit and a charging interface in turn, and the to-be-charged device feeds back a charging protocol; and a handshake information obtaining module 903, configured to obtain handshake success information sent by the USB protocol chip FIG. 10 is a block diagram showing another charging device according to some embodiments. Referring to FIG. 10, on the basis of the charging device shown in FIG. 8, the charging device 800 further includes:

a power supply module 1001, configured to control the power supply chip to stop supplying power to the USB protocol chip, and to control a fourth switching device to be turned on simultaneously, so that a power pin Vbus of the charging interface supplies power to the USB protocol chip.

It is understood that the charging device provided in the embodiment of the present disclosure corresponds to the above charging method, and reference can be made to the description of the method embodiments, which will not be repeated here.

As such, in these embodiments, by obtaining the event information of reversely charging the to-be-charged device, the serial-parallel conversion circuit is controlled to connect the first battery and the second battery in series, and the first battery and second battery connected in series charge the to-be-charged device. As such, by connecting two batteries in series in the embodiment of the present disclosure, the voltage of the batteries of the electronic device can be doubled, and there is no need to additionally provide the boost circuit in the electronic device, which can reduce the design difficulty of the electronic device. Moreover, since the voltage is doubled in the embodiment, the charging power can be increased, which can reduce the charging time and satisfy the demand for fast charging to a certain extent.

Figure 11:
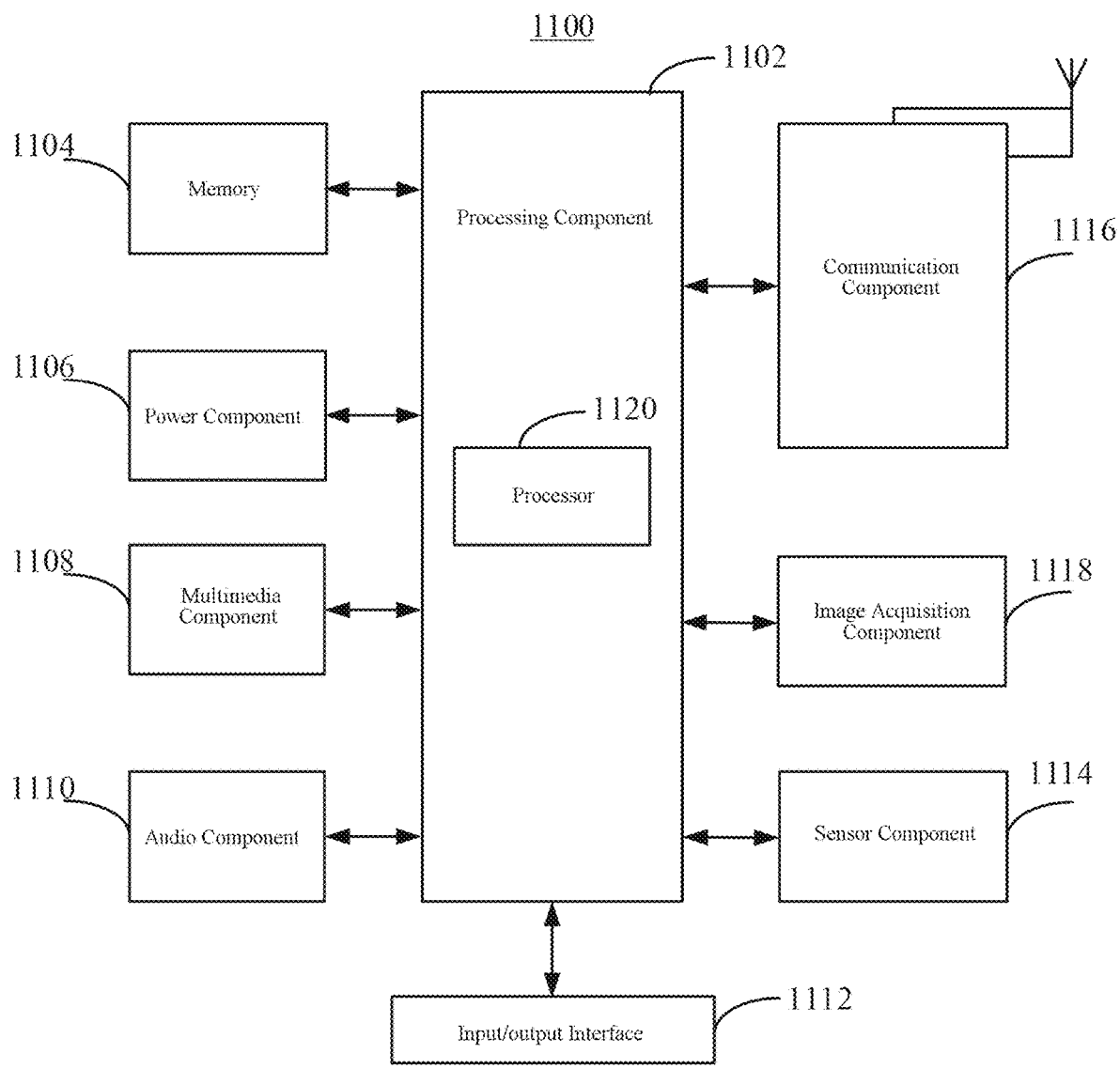
FIG. 11 is a block diagram showing an electronic device according to some embodiments.

FIG. 11 is a block diagram showing an electronic device according to some embodiments. For example, the electronic device 1100 may be a smartphone, a computer, a digital broadcasting terminal, a tablet device, a medical device, a fitness device, a personal digital assistant, etc. with the circuits shown in FIGS. 1A, 1B, 1C, 2, 3A, 3B, and 4.

Referring to FIG. 11, the electronic device 1100 may include one or more of the following components: a processing component 1102, a memory device 1104, a power component 1106, a multimedia component 1108, an audio component 1110, an input/output (I/O) interface 1112, a sensor component 1114, a communication component 1116 and an image acquisition component 1118.

The processing component 1102 typically controls the overall operations of the device 1100, such as the operations associated with display, telephone calls, data communications, camera operations, and recording operations. The processing component 1102 can include one or more processors 1120 to execute instructions to perform all or part of the steps in the above described methods. Moreover, the processing component 1102 can include one or more modules to facilitate the interaction between the processing component 1102 and other components. For example, the processing component 1102 can include a multimedia module to facilitate the interaction between the multimedia component 1108 and the processing component 1102. During the interaction, the processor 1120 can read the executable instructions from the memory 1104 to implement the steps of the methods shown in FIGS. 5-7.

The memory 1104 is configured to store various types of data to support the operation of the device 1100. Examples of such data include instructions for any application or method operated on device 1100, such as the contact data, the phone book data, messages, pictures, videos, and the like. The memory 1104 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 can include a power management system, one or more power sources, and other components associated with the generation, management, and distribution of power in the device 1100.

The multimedia component 1108 includes a screen providing an output interface between the device 1100 and a target subject. In some embodiments, the screen can include a liquid crystal display (LCD) and a touch panel (TP). In some embodiments, an organic light-emitting diode (OLED) display can be employed.

In some embodiments, the electronic device can be a mobile terminal having a flexible display screen such as the OLED display, which can be folded between a first display region and a second display region.

The first battery can be disposed at the first region, and the second battery is disposed at the second region. The serial-parallel conversion circuit can include a flexible printed circuit disposed between the first and second regions, and configured to be folded and unfolded for multiple times.

If the screen includes the touch panel, the screen can be implemented as a touch screen to receive input signals from the target subject. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 1110 is configured to output and/or input an audio signal. For example, the audio component 1110 includes a microphone (MIC) configured to receive an external audio signal when the device 1100 is in an operation mode, such as a call mode, a recording mode, and a voice recognition mode. The received audio signal may be further stored in the memory 1104 or sent via the communication component 1116. In some embodiments, the audio component 1110 also includes a speaker for outputting the audio signal.

The I/O interface 1112 provides an interface between the processing component 1102 and peripheral interface modules, such as a keyboard, a click wheel, buttons, and the like.

The sensor component 1114 includes one or more sensors for providing status assessments of various aspects of the device 1100. For example, the sensor component 1114 can detect an open/closed status of the device 1100, relative positioning of components, such as the display and the keypad of the device 1100. The sensor component 1114 can also detect a change in position of one component of the device 1100 or the device 1100, the presence or absence of target subject contact with the device 1100, an orientation, or an acceleration/deceleration of the device 1100, and a change in temperature of the device 1100.

The communication component 1116 is configured to facilitate wired or wireless communication between the device 1100 and other devices. The device 1100 can access a wireless network based on a communication standard, such as Wi-Fi, 2G, 3G, 4G, or 5G, or a combination thereof. In some embodiments, the communication component 1116 receives broadcast signals or broadcast associated information from an external broadcast management system via a broadcast channel. In some embodiments, the communication component 1116 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 1100 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In some embodiments, there is also provided a non-transitory computer-readable storage medium including instructions, such as included in a memory device 1104, executable by the processor 1120 of the device 1100 to perform steps of the above described methods. For example, the non-transitory computer readable storage medium may be a ROM, a random-access memory (RAM), a CD-ROM, a magnetic tape, a floppy disc, and an optical data storage device.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An electronic device, comprising:
a first battery;
a second battery;
a serial-parallel conversion circuit;
a USB protocol chip;
a fourth switching device; and
a charging interface,
wherein the serial-parallel conversion circuit is coupled to the first battery and the second battery, and configured to switch, according to a control signal, between:
coupling the first battery and the second battery in series so as to reversely charge a to-be-charged device by the first battery and the second battery; and
coupling the first battery and the second battery in parallel so as to supply power to the electronic device by the first battery and the second battery;
wherein the USB protocol chip is configured to send a handshake protocol to the to-be-charged device and receive a charging protocol feedback from the to-be-charged device; and
wherein a first terminal of the fourth switching device is connected to a power pin Vbus of the charging interface, a second terminal of the fourth switching device is connected to a power input terminal of the USB protocol chip, and a control terminal of the fourth switching device is connected to a processor of the electronic device, and is configured to turn on or turn off the power pin Vbus of the charging interface and the power input terminal of the USB protocol chip according to the control signal of the processor.

2. The electronic device according to claim 1, wherein the serial-parallel conversion circuit comprises a first switching device, a second switching device, and a third switching device,
wherein a first terminal of the first switching device is connected to an anode of the first battery, and a second terminal of the first switching device is connected to an anode of the second battery;
a first terminal of the second switching device is connected to a cathode of the second battery, and a second terminal of the second switching device is connected to a cathode of the first battery;
a first terminal of the third switching device is connected to the second terminal of the first switching device, and a second terminal of the third switching device is connected to the second terminal of the second switching device; and
a control terminal of the first switching device, a control terminal of the second switching device, and a control terminal of the third switching device are connected to a processor in the electronic device, and are configured to turn on or off the respective switching devices according to a received control signal, so that the first battery and the second battery are connected in series, or the first battery and the second battery are connected in parallel.

3. The electronic device according to claim 1, further comprising a USB switching circuit; wherein the USB switching circuit is connected to the charging interface and a processor in the electronic device, respectively, to form a first communication channel for communication between the processor and the charging interface; the USB switching circuit is connected to the charging interface and the USB protocol chip which is connected to the processor, respectively, to form a second communication channel for communication between the processor, the USB protocol chip and the charging interface; and the USB switching circuit is connected to the processor, and is configured to switch to the first communication channel or the second communication channel according to the control signal of the processor.

4. The electronic device according to claim 3, wherein a first group of terminals of the USB switching circuit is connected to the charging interface, a second group of terminals of the USB switching circuit is connected to a DP pin and a DM pin of the processor in the electronic device, a third group of terminals of the USB switching circuit is connected to a first group of terminals of the USB protocol chip, and a second group of terminals of the USB protocol chip is connected to the DP pin and the DM pin; and
a control terminal of the USB switching circuit is connected to a channel switching pin of the processor, and is configured to turn on the first group of terminals and the second group of terminals of the USB switching circuit or to turn on the first group of terminals and the third group of terminals of the USB switching circuit, according to the control signal of the processor.

5. The electronic device according to claim 1, further comprising a power supply chip, wherein the power supply chip is connected to the processor and the USB protocol chip, respectively, and is configured to supply power to the USB protocol chip or stop supplying power to the USB protocol chip according to the control signal of the processor; and
the USB protocol chip is electrically connected to one of the power supply chip and the power supply pin Vbus at a time.

6. The electronic device according to claim 1, further comprising a foldable display screen configured for folding between a first region and a second region; wherein:
the first battery is disposed at the first region;
the second battery is disposed at the second region; and the serial-parallel conversion circuit comprises a flexible printed circuit disposed between the first and second regions.

7. The electronic device according to claim 1, wherein the electronic device is configured to reversely charge the to-be-charged device by coupling the first and second batteries in series to double a voltage, thereby realizing fast charging of the to-be-charged device, compared with when supplying power to the electronic device by coupling the first and second batteries in parallel, and wherein the electronic device is configured to double the voltage without a boost circuit in the electronic device.

8. The electronic device according to claim 1, wherein the serial-parallel conversion circuit is configured to receive the control signal from the processor or a charging chip.

9. A charging method, which is applicable to an electronic device, the electronic device comprising a first battery, a second battery, a serial-parallel conversion circuit, a USB protocol chip, a fourth switching device, a charging interface and a processor, wherein the USB protocol chip is configured to send a handshake protocol to a to-be-charged device and receive a charging protocol feedback from the to-be-charged device, a first terminal of the fourth switching device is connected to a power pin Vbus of the charging interface, a second terminal of the fourth switching device is connected to a power input terminal of the USB protocol chip, and a control terminal of the fourth switching device is connected to a processor of the electronic device, the method comprising:
    in response to receiving event information indicating to reversely charge a to-be-charged device, controlling the serial-parallel conversion circuit to couple the first battery and the second battery in series to charge a to-be-charged device by the first battery and the second battery connected in series; and
    controlling the fourth switching device to turn on or turn off the power pin Vbus of the charging interface and the power input terminal of the USB protocol chip according to a control signal of the processor.

10. The charging method according to claim 9, wherein prior to the controlling the serial-parallel conversion circuit to connect the first battery and the second battery in series, the method further comprises:
    obtaining the event information sent by the charging chip, the event information indicating that the charging chip detects a presence of a pull-down resistor on a charging line;
    in response to the event information, controlling a USB switching circuit to switch to a second communication channel which is formed between the USB protocol chip, a USB switching circuit and the charging interface, and simultaneously controlling a power supply chip to supply power to the USB protocol chip; and
    obtaining handshake success information sent by the USB protocol chip.

11. The charging method according to claim 10, wherein subsequent to the charging the to-be-charged device by the first battery and the second battery connected in series, the method further comprises:
    controlling the power supply chip to stop supplying power to the USB protocol chip, and simultaneously controlling the fourth switching device to be turned on, so that the power pin Vbus of the charging interface supplies power to the USB protocol chip.

12. A non-transitory computer-readable storage medium storing instructions thereon for execution by a processing circuit to implement operations of the method according to claim 9.

13. An electronic apparatus, comprising:
    a processor; and
    a memory device storing instructions executable by the processor,
    wherein the processor is configured to execute the instructions in the memory device to perform operations of a charging method that is applicable to an electronic device comprising a first battery, a second battery, a serial-parallel conversion circuit, a USB protocol chip, a fourth switching device, and a charging interface, wherein the USB protocol chip is configured to send a handshake protocol to a to-be-charged device and receive a charging protocol feedback from the to-be-charged device, a first terminal of the fourth switching device is connected to a power pin Vbus of the charging interface, a second terminal of the fourth switching device is connected to a power input terminal of the USB protocol chip, and a control terminal of the fourth switching device is connected to a processor of the electronic device, the method comprising:
    in response to receiving event information indicating to reversely charge a to-be-charged device, controlling the serial-parallel conversion circuit to couple the first battery and the second battery in series to charge the to-be-charged device by the first battery and the second battery connected in series; and
    controlling the fourth switching device to turn on or turn off the power pin Vbus of the charging interface and the power input terminal of the USB protocol chip according to a control signal of the processor.

14. The electronic apparatus according to claim 13, wherein prior to the controlling the serial-parallel conversion circuit to connect the first battery and the second battery in series, the method further comprises:
    obtaining the event information sent by a charging chip, the event information indicating that the charging chip detects a presence of a pull-down resistor on a charging line;
    in response to the event information, controlling a USB switching circuit to switch to a second communication channel which is formed between the USB protocol chip, a USB switching circuit and the charging interface, and simultaneously controlling a power supply chip to supply power to the USB protocol chip; and
    obtaining handshake success information sent by the USB protocol chip.

15. The electronic apparatus according to claim 14, wherein subsequent to charging the to-be-charged device by the first battery and the second battery connected in series, the method further comprises:
    controlling the power supply chip to stop supplying power to the USB protocol chip, and simultaneously controlling the fourth switching device to be turned on, so that the power pin Vbus of the charging interface supplies power to the USB protocol chip.

16. The electronic apparatus according to claim 15, further comprising the USB switching circuit; wherein the USB switching circuit is connected to the charging interface and a processor in the electronic device, respectively, to form a first communication channel for communication between the processor and the charging interface; the USB switching circuit is connected to the charging interface and the USB protocol chip which is connected to the processor, respectively, to form the second communication channel for communication between the processor, the USB protocol chip and the charging interface; and the USB switching circuit is connected to the processor, and is configured to switch to the first communication channel or the second communication channel according to the control signal of the processor.

17. The electronic apparatus according to claim 16, wherein a first group of terminals of the USB switching circuit is connected to the charging interface, a second group of terminals of the USB switching circuit is connected to a DP pin and a DM pin of the processor in the electronic device, a third group of terminals of the USB switching circuit is connected to a first group of terminals of the USB protocol chip, and a second group of terminals of the USB protocol chip is connected to the DP pin and the DM pin; and a control terminal of the USB switching circuit is connected to a channel switching pin of the processor, and is configured to turn on the first group of terminals and the second group of terminals of the USB switching circuit or to turn on the first group of terminals and the third group of terminals of the USB switching circuit, according to the control signal of the processor.

18. The electronic apparatus according to claim 13, further comprising a power supply chip, wherein the power supply chip is connected to the processor and the USB protocol chip, respectively, and is configured to supply power to the USB protocol chip or stop supplying power to the USB protocol chip according to the control signal of the processor; and the USB protocol chip is electrically connected to one of the power supply chip and the power supply pin Vbus at a time.

* * * * *